US012635722B2

(12) United States Patent
Madsen et al.

(10) Patent No.: US 12,635,722 B2
(45) Date of Patent: May 26, 2026

(54) USE OF HIGH ACYL GELLAN IN WHIPPING CREAM

(71) Applicant: INTERNATIONAL N&H DENMARK APS, Copenhagen (DK)

(72) Inventors: Finn Madsen, Abyhoj (DK); Frédéric Liot, Harlev (DK)

(73) Assignee: INTERNATIONAL N&H DENMARK APS, Kongens Lyngby (DK)

( * ) Notice: Subject to any disclaimer, the term of this patent is extended or adjusted under 35 U.S.C. 154(b) by 0 days.

(21) Appl. No.: 18/615,040

(22) Filed: Mar. 25, 2024

(65) Prior Publication Data

US 2025/0049092 A1     Feb. 13, 2025

Related U.S. Application Data

(63) Continuation of application No. 17/673,207, filed on Feb. 16, 2022, now abandoned, which is a continuation of application No. 16/779,766, filed on Feb. 3, 2020, now abandoned, which is a continuation of application No. 14/888,990, filed as application No. PCT/EP2014/059637 on May 12, 2014, now abandoned.

(30) Foreign Application Priority Data

May 13, 2013     (EP) ..................................... 13167502

(51) Int. Cl.
| | | |
|---|---|---|
| *A23P 30/40* | (2016.01) | |
| *A23L 9/20* | (2016.01) | |
| *A23L 29/269* | (2016.01) | |

(52) U.S. Cl.
CPC ................. *A23P 30/40* (2016.08); *A23L 9/20* (2016.08); *A23L 29/272* (2016.08); *A23V 2002/00* (2013.01)

(58) Field of Classification Search
CPC .......... A23L 9/20; A23L 29/272; A23P 30/40; A23V 2002/00; A23V 2200/246; A23V 2250/5054
USPC ......................................................... 426/564
See application file for complete search history.

(56) References Cited

U.S. PATENT DOCUMENTS

2005/0048184 A1 * 3/2005 Arnould ................. A23L 27/60
426/564

FOREIGN PATENT DOCUMENTS

JP          2001245620 A  *  9/2001  ........... A23D 7/0053

* cited by examiner

*Primary Examiner* — Subbalakshmi Prakash

(57) ABSTRACT

Use of high acyl gellan in whipping cream.

22 Claims, 9 Drawing Sheets

Sample 81                    Sample 84

USE OF HIGH ACYL GELLAN IN WHIPPING CREAM

CROSS-REFERENCE TO RELATED PATENT APPLICATIONS

This patent claims priority as a continuation under 35 USC § 120 to U.S. patent application Ser. No. 17/673,207 (filed Feb. 16, 2022, now abandoned), which, in turn, claims priority as a continuation under 35 USC § 120 to U.S. patent application Ser. No. 16/779,766 (filed Feb. 3, 2020, now abandoned), which, in turn, claims priority as a continuation under 35 USC § 120 to U.S. patent application Ser. No. 14/888,990 (filed Nov. 4, 2015, now abandoned), which, in turn, claims priority under 35 USC § 371 as a national phase of Int'l Patent Appl. PCT/EP2014/059637 (filed May 12, 2014; and published on Nov. 20, 2014 as Int'l Publ. No. WO2014/184134), which, in turn, claims priority to European Patent Appl. No. 13167502.7 (filed May 13, 2013). The entire texts of the above-referenced patent applications are incorporated by reference into this patent.

FIELD OF THE INVENTION

The present invention relates to a whipping cream, an aerated whipped cream thereof, a whipping agent additive, methods for aeration of a whipping cream to obtain an aerated whipped cream, and use of high acyl gellan or said whipping agent additive for providing firmness to an aerated whipping cream, and/or for providing faster aeration of a whipping cream and/or for reducing protein aggregation in whipping cream at acid pH and/or improvement in aeration of low fat whipping cream.

BACKGROUND OF THE INVENTION

The market for vegetable whipping cream, also commonly known as imitation cream or non-dairy cream, is increasing especially due to the vast variety of applications of the product. There are very low seasonal variations in the final product compared to those of dairy whipping cream and this is a benefit in many applications. Also the significantly lower manufacturing costs relative to those involved in the manufacture of dairy whipping cream makes the product increasingly popular.

Imitation cream is an oil in water (o/w) emulsion produced from vegetable fat, proteins, typically skimmed milk or Na-caseinate+water, sugars, emulsifiers/stabilisers and flavour. The applications vary from industrial to small-scale consumers whom often use the product for cake decoration.

Producing a good imitation cream with short whipping time, good overrun, a firm and stable foam and a good mouth-feel is not easily accomplished. There are many aspects, which have an impact on its quality. The foam in the whipped imitation cream is typically fat stabilized, and to obtain good whipping a certain degree of protein desorption from fat globules should take place, and the fat should be partly agglomerated or even with partial coalescence. This is achieved through selection of emulsifiers and by having a partial crystallization of the fat. However, the conditions for having good whipping properties, namely partly destabilization of the emulsion, also have a negative impact on the storage stability of the imitation cream, seen as a thickening of the cream in the bottle/container. This thickening can be so severe that the cream cannot be poured out of the container, and in some cases the whipping performance is also lost.

Various solutions have been attempted to improve storage stability of the imitation cream, e.g. addition of anionic emulsifiers, which through their charge and protein binding properties reduce fat globule interactions. However, the whipping properties (overrun and whipped cream firmness) are then reduced. Hitherto no ingredient has been identified, where there have not been a negative correlation between imitation cream stability and whipping properties.

In many countries an important quality parameter for imitation cream is the tolerance towards acidification, e.g. through addition of fruit syrups. Typically the protein will denaturate and aggregate, and a very firm and grainy whipped cream with low overrun is achieved.

In vegetable whipping cream or imitation cream important quality parameters are thus a stable cream, which will not thicken during storage before aeration for example in a bottle and still being able to aerate relatively fast, giving a whipped cream with high overrun and a firm texture, which can be shaped and will keep the shape. Whipping cream stability in the bottle and good whipped cream properties have hitherto been conflicting properties, improving the one leading to worsening of the other.

In many countries the tradition of adding acid fruit syrup to the cream during or after the whipping process have further created quality issues in the whipped cream like graininess, foam collapse and extreme firmness, giving very poor spreadability.

JP 2005 295841 discloses a foamed food product comprising a combination of gelatin, native-type gellan gum, and deacylation type gellan gum, and using a high temperature of between 45-65° C. during whipping. JP 2001 245620 discloses use of a gellan gum.

Furthermore, there is for some applications a wish in the industry to reduce the fat level, while keeping the quality of the whipped cream. This has also proven very difficult, as the component fat is an essential part in creation and stabilization of whipped creams.

SUMMARY OF THE INVENTION

It is an object of embodiments of the invention to provide an efficient whipping agent additive and uses thereof for aerating, preferably at a lower temperature such as below 25° C. and preferably by fat stabilisation, a whipping cream such as in vegetable whipping cream applications, a whipping cream comprising said whipping agent additive, and whipped food products such as vegetable whipped cream based on this whipping agent and a method for aeration, preferably at a lower temperature such as below 25° C., of said whipping cream. It has surprisingly been found that it is possible to secure a good whipping cream having acceptable storage stability, while still keeping good whipping properties by the use of high acyl gellan gum, in the following also called HA gellan. When stabilising the whipping cream with a suitable combination of whipping promoting emulsifiers (e.g. monoglycerides or lactic acid esters of monoglycerides) and anionic emulsifiers, HA gellan has been shown not to have a negative influence on storage stability, but to improve whipping speed and final whipped cream firmness. Without wishing to be bound by any theory it is believed that it is due to the surprising effect of HA gellan to create more efficiently fat stabilised foams. This is achieved to a much higher extent than with other hydrocolloids with respect to whipping speed and with much less negative impact on whipping cream thickness and whipped cream eating quality (no off taste, stickiness or unpleasant mouth coating). It has surprisingly been observed that acidification of the whipped cream through addition of acid fruit syrup gave far less graininess of the whipped cream, when adding HA gellan to the recipe. Furthermore, it was observed that it was possible to aerate low fat cream with addition of HA gellan while keeping an acceptable quality of the whipped cream. It has also been found that the whipping may be performed at a low temperature such as below 25° C. It has been found especially useful to use an increased shear rate gradient.

Accordingly the invention relates to a whipping cream comprising high acyl gellan.

The invention further relates to a whipped cream which is an aerated whipping cream as disclosed herein.

The invention further relates to a method for aeration of a whipping cream as disclosed herein to obtain an aerated whipped cream which method comprises the following steps: providing a whipping cream as disclosed herein, and aerating, preferably at a lower temperature such as below 25° C., said whipping cream to obtain said whipped cream.

The invention further relates to a whipping agent additive comprising high acyl gellan.

The invention further relates to a method for aeration, preferably at a lower temperature such as below 25° C., of a cream to obtain a whipped cream which method comprises the following steps: adding a whipping agent additive as disclosed herein to a cream in the manufacture of a whipping cream, wherein the aeration preferably is performed at a lower temperature such as below 25° C.

The invention further relates to use of high acyl gellan or use of a whipping agent additive as disclosed herein for providing an improvement in firmness to an aerated whipping cream.

The invention further relates to use of high acyl gellan or use of a whipping agent additive as disclosed herein for improving storage stability of an aerated whipping cream.

The invention further relates to use of high acyl gellan or use of a whipping agent additive as disclosed herein for providing faster whipping of a whipping cream.

The invention further relates to use of high acyl gellan or use of a whipping agent additive as disclosed herein for improving whipping of a low fat whipping cream.

The invention further relates to use of high acyl gellan or use of a whipping agent additive as disclosed herein for reducing protein aggregation in a whipping cream or in a whipped cream at acid pH.

FIGURES

Figure 3:
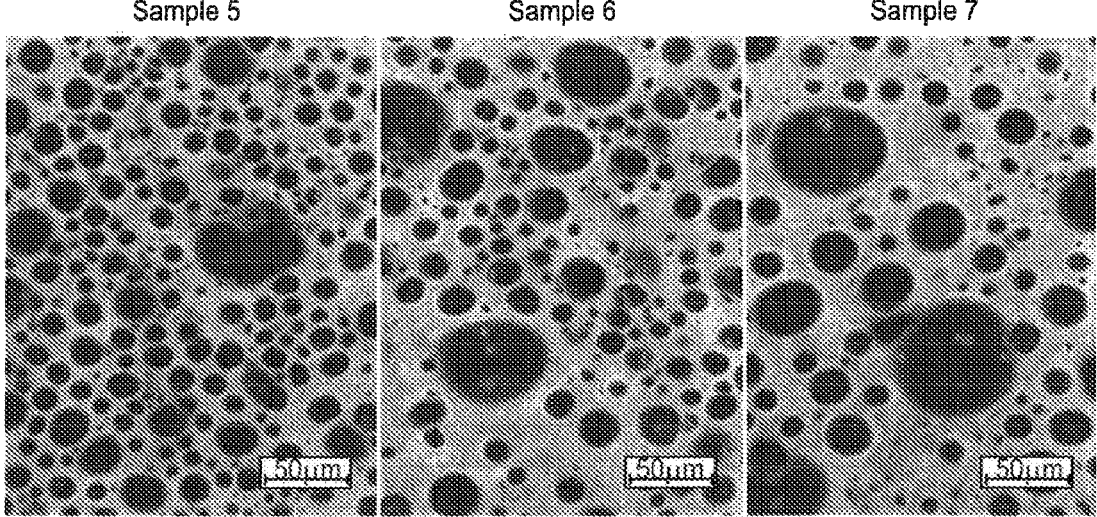

FIG. 3 shows the foam microstructure of whipped vegetable creams samples 5, 6 and 7 from Example 1. The scale bar is 50 micron. Fat is coloured with Nile Red (seen as light grey in black/white), and protein phase is coloured with FITC (seen as dark grey in black/white).

Figure 4:
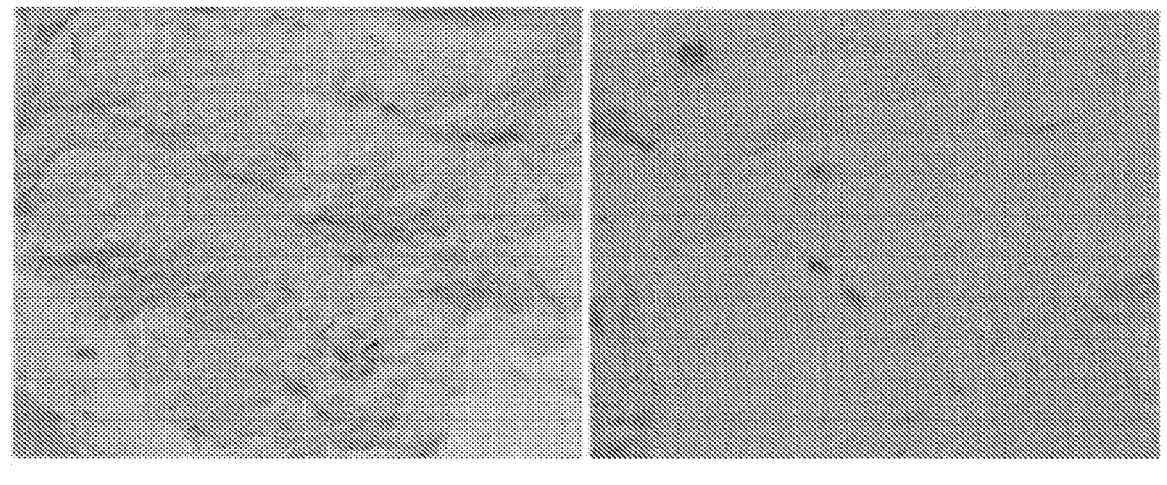

FIG. 4 shows pictures of whipped creams of samples 81 and 84 with addition of "Yoghurt-Erdbeer Sahne Fond" from Votella from Example 2.

Figure 5:
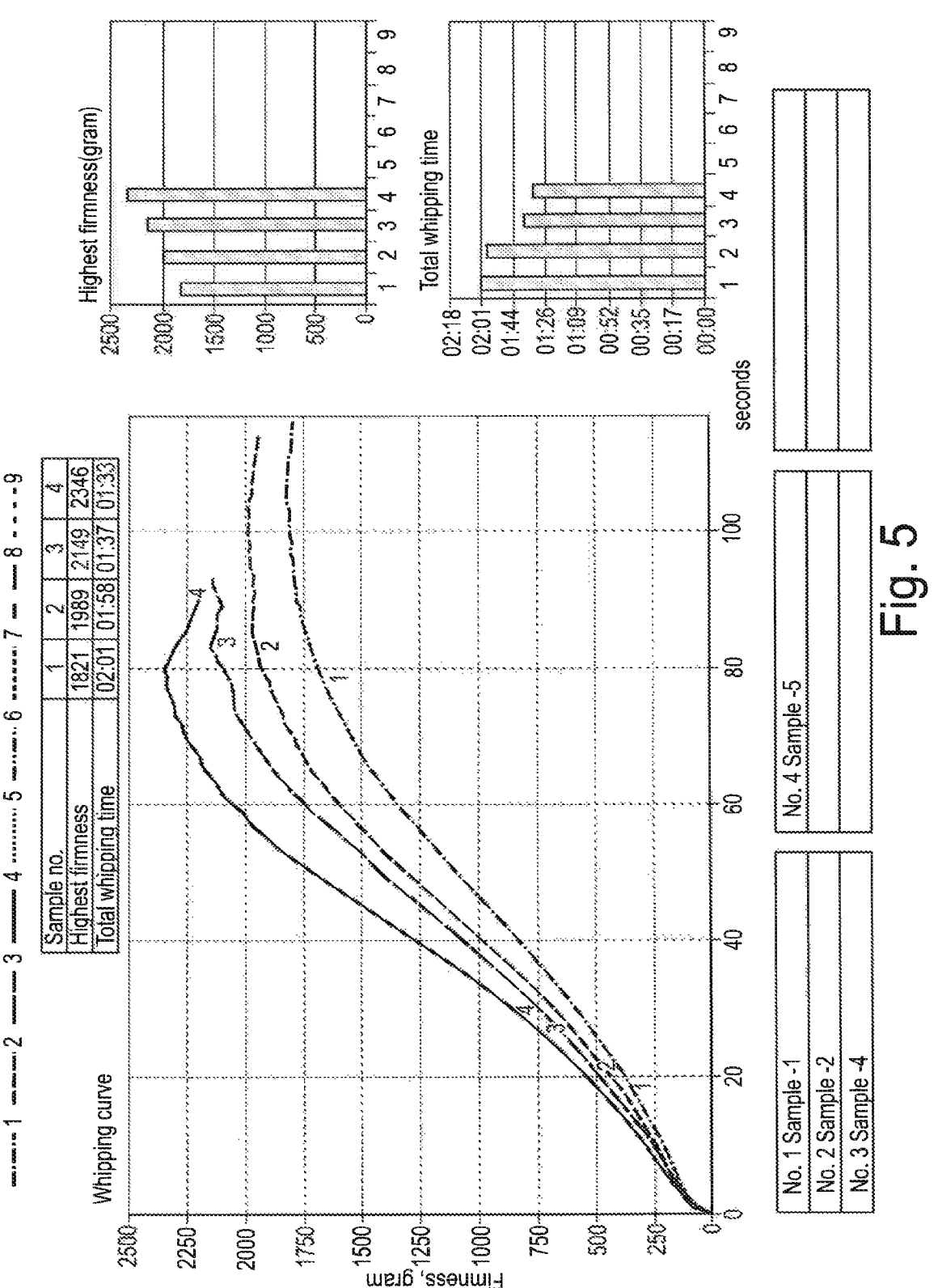

FIG. 5 shows the whipping profile of vegetable cream samples 1, 2, 4 and 5 from example 3.

Figure 6:
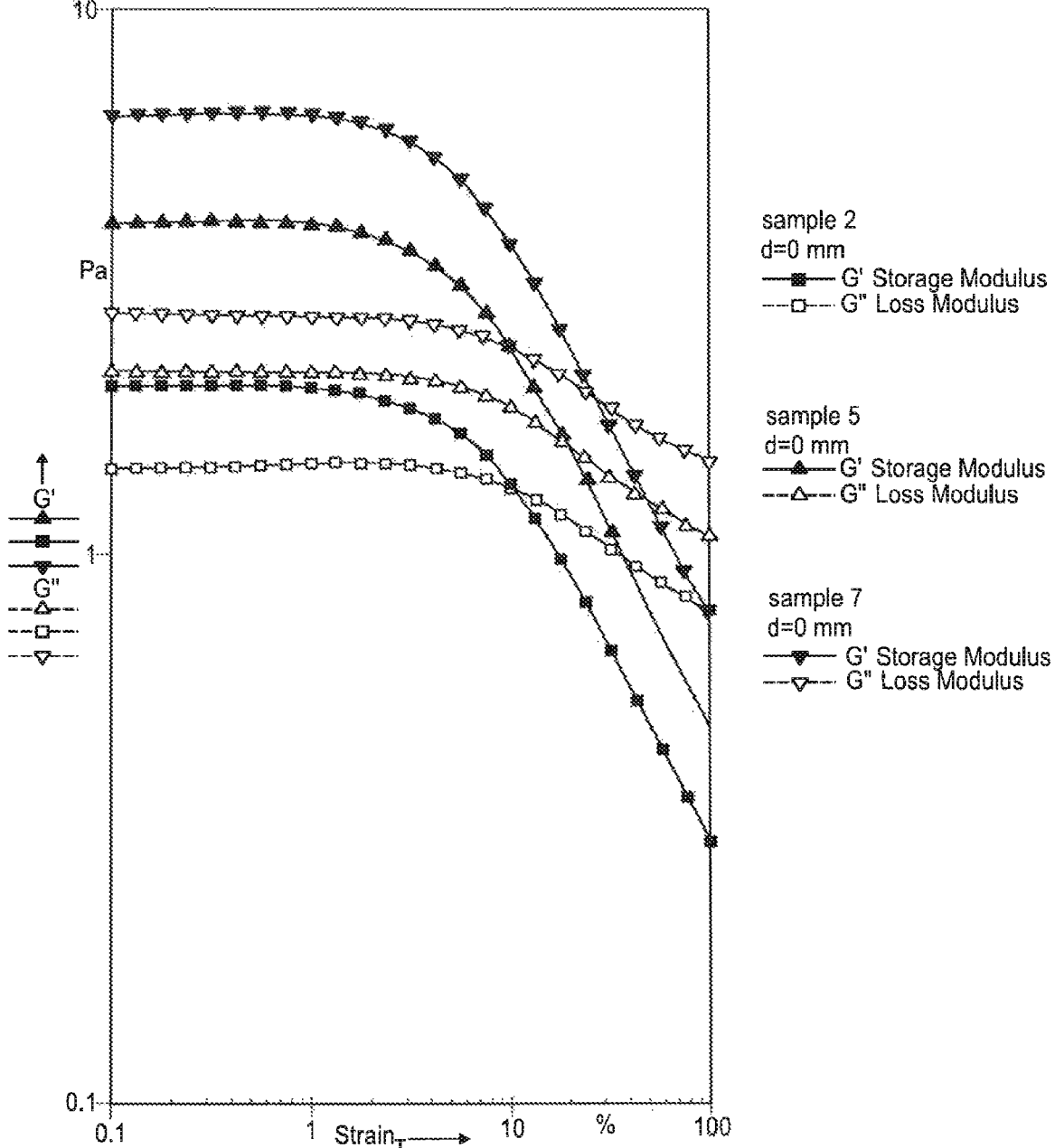

FIG. 6 shows a strain sweep of vegetable cream samples 2, 5 and 7 from Example 4.

Figure 7:
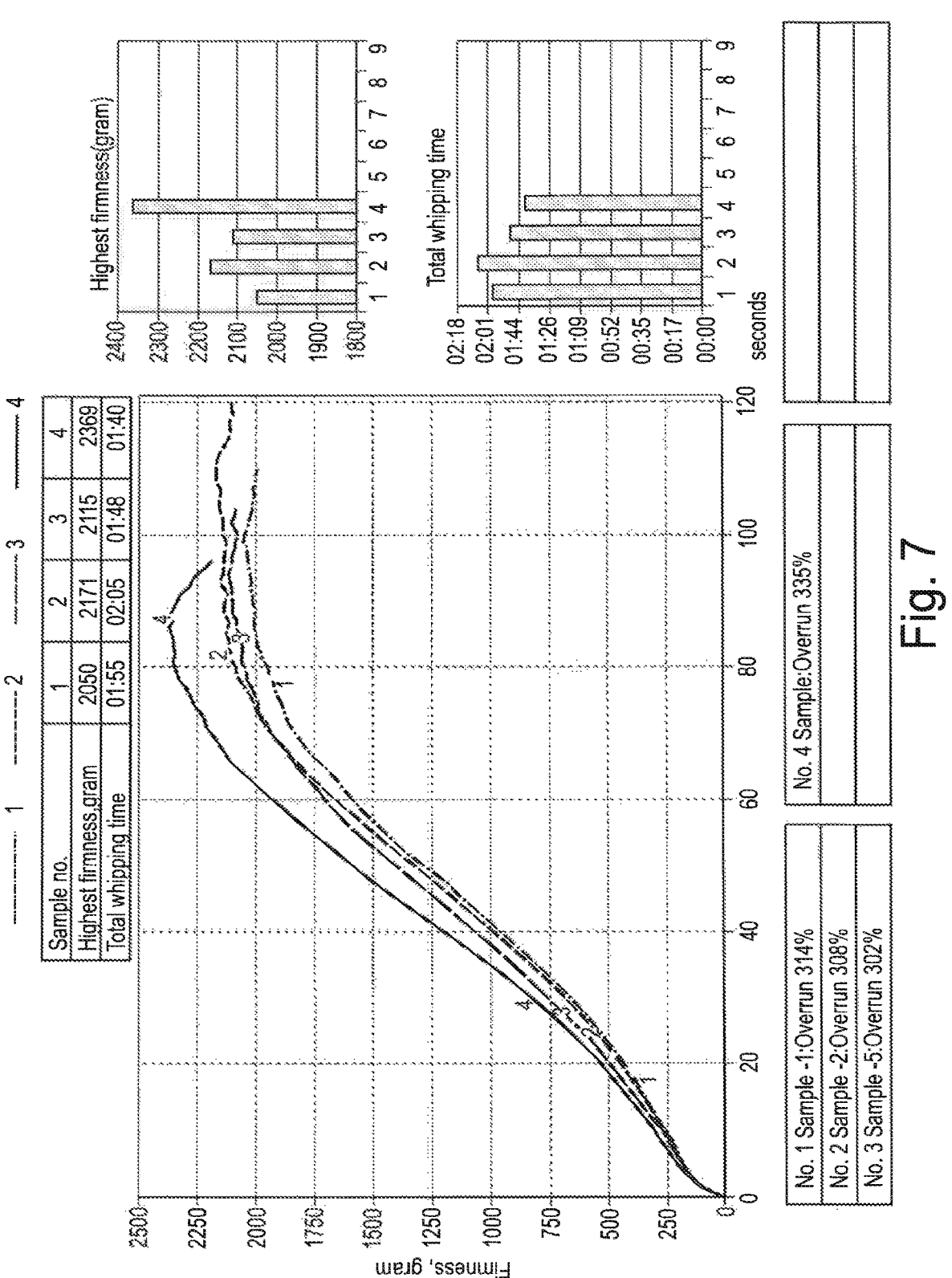

FIG. 7 shows the whipping profile of vegetable cream samples 1 and samples 2, 5, 7 from Example 4.

Figure 8:
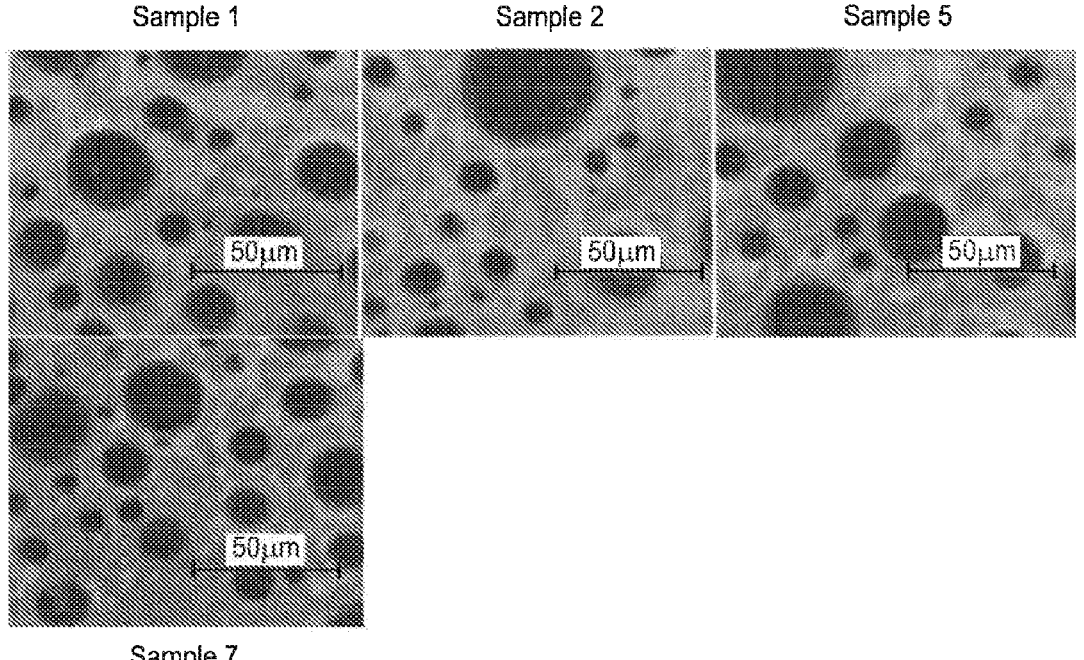

FIG. 8 shows the foam microstructure of whipped vegetable creams sample 1 and samples 2, 5 and 7 from example 4. Scale bar: 50 micron. Fat is coloured with Nile Red (seen as light grey in black/white), and protein phase is coloured with FITC (seen as dark grey in black/white).

Figure 9:
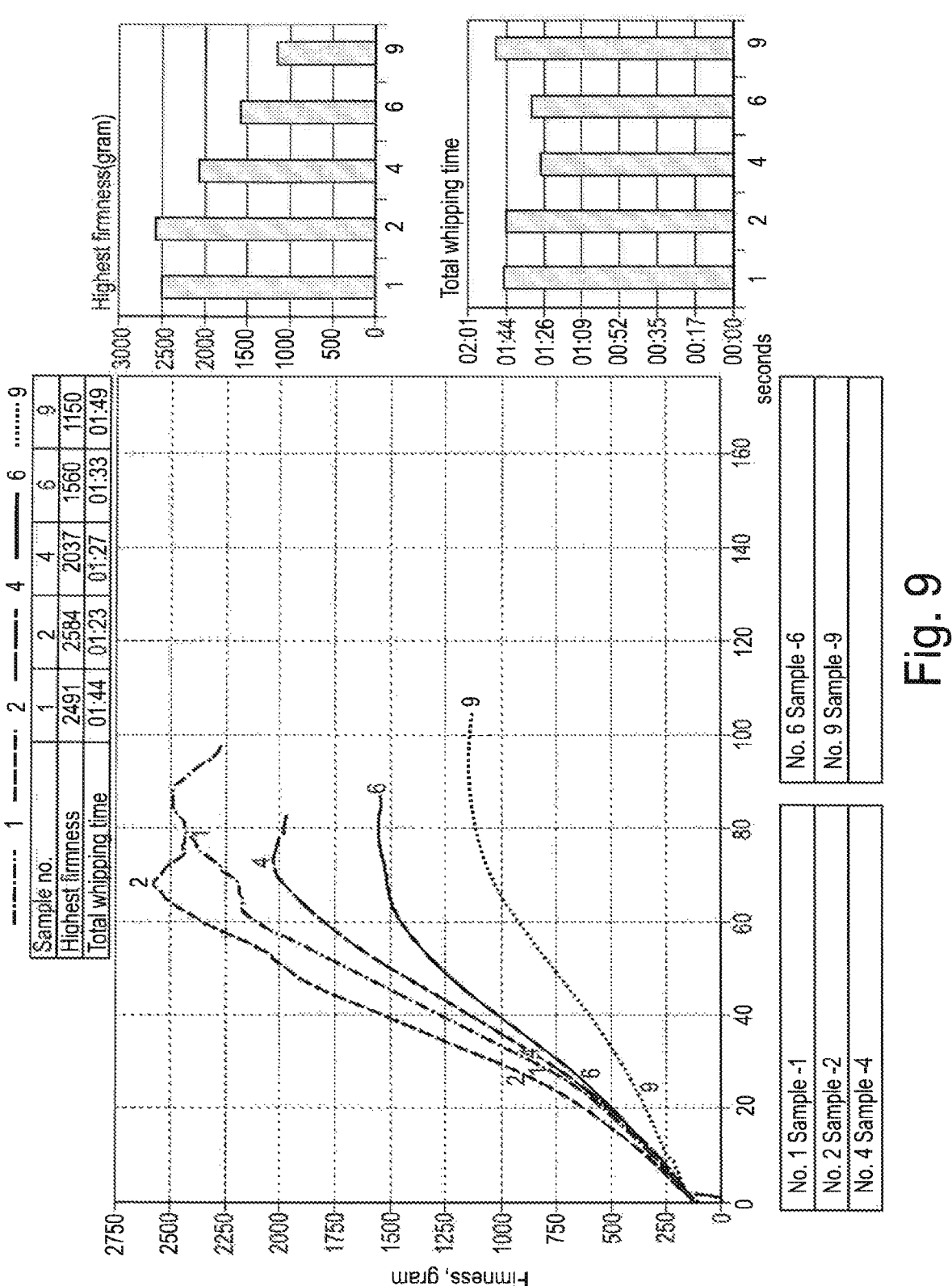

FIG. 9 shows a whipping profile of vegetable cream samples 1, 2, 4, 6, 9 and 14 from example 5.

DEFINITIONS

In the present context a "whipping cream" means an o/w emulsion, which can be aerated by whipping, whereby fat globules collide and partially coalesce, forming aggregates or clusters that stabilise the foam structure.

In the present context a "vegetable whipping cream" means an o/w emulsion, where the fat is vegetable fat or pre-dominantly vegetable fat, which can be aerated by whipping, whereby fat globules collide and partially coalesce, forming aggregates or clusters that stabilise the foam structure.

In the present context "fat-stabilised" means that the foam structure is stabilised by fat globule aggregates or clusters, typically with partial fat globule coalescence.

In the present context a "whipping agent additive" as described herein is a mixture of substances, some with interfacial properties that due to their adsorption dynamic and their presence at the gas-liquid interface and/or fat-liquid interface and/or ability to desorp protein from the fat globule surface will facilitate the uptake and stabilisation of gas cells when the product that contains the whipping agent is aerated. Also the "whipping agent additive" may contain various hydrocolloids (stabilisers), salts (buffers) and proteins.

In the present context the term "emulsifier" means one or more chemical additives that encourage the suspension of one liquid in another, as in the mixture of oil and water in margarine, shortening, ice cream, and salad dressing.

In the present context, the emulsifier is different from the protein, such as vegetable protein or milk protein. In one aspect, the emulsifier is one or more chemical additives of non-protein origin.

In the present context "aeration" means to increase overrun compared to a product with no air incorporated.

In the present context the term "firmness" relates to the texture of an aerated whipping cream for example as described and measured in example 1 herein. By an "improvement in firmness" is meant a firmer texture of an aerated whipping cream as disclosed herein compared to the same aerated whipping cream without addition of high acyl gellan, and/or compared to the same aerated whipping cream with addition of another stabiliser commonly used to provide firmness in whipped cream.

In the present context "heat shock stability" may be evaluated by any method known to the skilled person for example as described herein in the examples. Heat-shocked samples should mimic the quality that the final consumer may meet after prolonged storage of the whipping cream, contrary to fresh samples, which is the quality that the producer observes and evaluates shortly after production.

In the present context "overrun" is a measure of the volume of air whipped into the product. In the present context "overrun" may be measured by any method known to the skilled person for example as described herein in the examples for example by filling whipped cream in a 240 ml beaker and weighing the 240 ml beaker and calculating % overrun=100×(240×1.02/weight of foam)−100. In one aspect, an acceptable overrun as measured according to this method is above 200%, more preferable above 250% and even more preferable above 300%.

DETAILED DISCLOSURE OF THE INVENTION

Unless defined otherwise, all technical and scientific terms used herein have the same meaning as commonly understood by one ordinary skilled in the art.

The present invention relates to a whipping cream comprising high acyl gellan.

High acyl gellan (in the following also called HA gellan) should be distinguished from low acyl gellan (in the following also called LA gellan). HA gellan and LA gellan are both categorized as gellan gum. Gellan gum may be produced by the microorganism *Sphingomonas elodeao*. The molecular structure of gellan gums is in general a straight chain based on repeating glucose, rhamnose and glucuronic acid units. In its native or high-acyl form, two acyl substituents—acetate and glycerate—are present. Both substituents are located on the same glucose residue and, on average, there is one glycerate per repeat and one acetate per every two repeating unit. In low acyl gellan gum the acyl groups are pre-dominantly absent. The presence or absence of the acyl groups on the gellan gum polysaccharide backbone has a profound effect on its functional properties. LA gellan will typically gel in the temperature region 20-40° C., and gel properties will be much affected by calcium. HA gellan will typically gel in the temperature region 50-80° C., and gel properties will be more elastic and less brittle than for LA gellan and to a higher degree not influenced by calcium. A description of gellan gum, including HA and LA gellan, is e.g. given by Valli and Clark (ref 4). According to Morris (ref 5), a sufficient amount of glycerate in acetate devoid gellan will possess high acyl functional behaviour, as seen in gelling profiles, determined by DSC. When lowering the glycerate content, the "high acyl" gel peak is becoming smaller and is seen at a gradually lower temperature, and the "low acyl" gelling peak is gradually becoming bigger. Therefore intermediate molecular structures exist with intermediate functionality. Exemplary high acyl gellans include KELCOGEL LT 100, available from CP Kelco, Inc., Kelcogel HMB-P, also available from CPKelco, KELCOGEL HT, and the high acyl gellans described in U.S. Publication No. 2005/0266138. In various exemplary embodiments, the high acyl gellan gum can be a clarified high acyl gellan. Other examples of high acyl gellan products are GELLAN NM 205 and Gellan Gum DAI 90, produced by DuPont.

In one aspect, said HA gellan means a gellan having a gelling profile, where more than 50% of the gelling enthalpy is at temperatures above 40° C., and more preferably more than 90% of the gelling enthalpy is at temperatures above 40° C., as determined by DSC, when cooling a 1% gellan solution (the gellan sodium salt in deionised water) with 0.7 c/min, as described by Morris (ref 5).

The amount of high acyl gellan to be added depends on for example the desired firmness of the aerated whipping cream, the whipping speed to be used, the acidity of the whipping cream and the other ingredients in the whipping cream (the whipping cream recipe). Typically the dosage of high acyl gellan will be in in the range of 0.005% (w/w) to 0.2% (w/w). In a preferred aspect, the dosage will be in in the range of 0.0125% (w/w) to 0.1% (w/w) high acyl gellan based on the whipping cream. In a preferred aspect, the dosage will be in in the range of 0.02% (w/w) to 0.05% (w/w) high acyl gellan based on the whipping cream.

The whipping cream as described herein is typically an o/w emulsion comprising fat(s) such as vegetable fat, protein(s), typically skimmed milk or Na-caseinate and water, sweetener(s) such as sugars, salt(s), buffer salt(s), emulsifier(s), stabiliser(s) and flavour(s). Other protein sources than skimmed milk protein or Na-caseinate, e.g. soy protein and butter milk powder may also be used or a combination of protein sources. Other interfacial active components, like hydroxypropyl methylcellulose (HPMC), may also be used to stabilise the emulsion.

In a further aspect, said whipping cream comprises between 10% (w/w) and 45% (w/w) fat, preferably between 15% (w/w) and 40% (w/w) fat and more preferable between 20% (w/w) and 35% (w/w) fat. In one aspect, said whipping cream comprises a low amount of fat such as between 15% (w/w) and 30% (w/w) fat, for example between 15% (w/w) and 28% (w/w) fat. In a further aspect, said whipping cream comprises between 10% (w/w) and 45% (w/w) vegetable fat, preferably between 15% (w/w) and 40% (w/w) vegetable fat and more preferable between 20% (w/w) and 35% (w/w) vegetable fat. In one aspect, said whipping cream comprises a low amount of fat such as between 15% (w/w) and 30% (w/w) vegetable fat, for example between 15% (w/w) and 28% (w/w) vegetable fat. As shown in the examples % improvement in texture by HA gellan addition is especially high at lower fat levels. In one aspect, HA gellan is thus beneficial in creation of vegetable whipping creams with lower amounts of fat or diluted vegetable whipping creams, eg diluted with syrups, still having excellent whipping and whipped cream properties. In a further aspect, part or all of said fat is vegetable fat.

In one aspect, at least 80% of the total amount of fat in the whipping cream is vegetable fat, preferably at least 90% of the total amount of fat in the whipping cream is vegetable fat, and more preferred all of the fat is vegetable fat.

The preferred types of vegetable fat are characterised by having sufficient crystallinity at whipping temperature to facilitate aeration and stability of the foam. In one aspect, a suitable vegetable fat is derived from one or more of the group consisting of coconut oil, palm kernel oil, palm oil, peanut oil, soybean oil, rapeseed oil, sunflower seed oil, cotton seed oil, olive oil, preferably derived from one or more of the group consisting of coconut oil, palm kernel oil and palm oil, more preferred derived from one or more of the group consisting of coconut oil and palm kernel oil. In a further aspect, the vegetable fat is derived from palm kernel oil.

In one aspect, the whipping cream is fat-stabilised.

The whipping cream may further comprise one or more of the following: protein(s), emulsifier(s), stabiliser(s), buffer salt(s), salt(s), sweetener(s), and flavour(s).

In one aspect, said protein is selected from one or more of the group consisting of sodium caseinate, skimmed milk powder, butter milk powder, soya protein and pea protein.

In one aspect, said stabiliser is selected from one or more of the following: carrageenan, locust bean gum, tara gum, xanthan gum, pectin, alginate, guar gum, microcrystalline cellulose, methyl cellulose, carboxymethyl cellulose, hydroxypropylmethyl cellulose, starch products and gelatine. In one aspect, said stabiliser it not gelatine.

In one aspect, said salt is sodium chloride. Examples of buffer salts are, e.g. citrates and/or phosphates.

In one aspect, said sweetener(s) is a sugar such as one of the following examples sucrose, glucose, fructose, or glucose syrup with different DE (dextrose equivalent) or a mixture of one or more such sweeteners. In a further aspect, said sweetener(s) is a low calorie sweetener such as sorbitol, lactitol, or xylitol, or a mixture of one or more such sweeteners. In one aspect, said sweetener(s) is one or more selected from sugar(s) and/or low calorie sweetener(s).

In one aspect, said flavour is an acidic syrup, typically fruit based. The syrup may be made from powders, fruit juices, fruit juice concentrates or artificially from acidified sugar syrups and flavours.

The whipping cream may advantageously also comprise one or more emulsifiers.

In one aspect, the emulsifier consists of one or more emulsifiers promoting whipping, either directly or by promoting protein desorption from the fat globules, and emulsifiers promoting cream stability, e.g. anionic emulsifiers like DATEM.

Emulsifiers in the food technology are any of the numerous chemical additives that facilitate two non-miscible liquids to form an emulsion, as in the mixture of oil and water in margarine, shortening and salad dressing.

Preferred emulsifiers may be selected from the group consisting of sodium stearoyl lactylate (SSL), calcium stearoyl lactylate (CSL), polysorbates, monoglycerides, diglycerides, mono/diglycerides, polyglycerol esters, lactic acid esters of monoglycerides, lactic acid esters of diglycerides, lactic acid esters of mono/diglycerides, polysorbate, sucrose esters of monoglycerides, sucrose esters of diglycerides, sucrose esters of mono/diglycerides, diacetyl tartaric acid esters of monoglycerides, diacetyl tartaric acid esters of diglycerides, diacetyltartaric acid esters of mono- and diglycerides of fatty acids (DATEM), citric acid esters of monoglycerides, citric acid esters of diglycerides, citric acid esters of mono- and diglycerides of fatty acids (citrem), lecithins and combinations thereof.

In one aspect, the emulsifier(s) used is one or more emulsifiers selected from the group consisting of polyglycerol esters of fatty acids (PGE), polysorbate, monoglycerides, mono/diglycerides, lactylates, lactic acid esters of mono/diglycerides (lactems), diacetyltartaric acid esters of mono- and diglycerides of fatty acids (datems), citric acid esters of mono- and diglycerides of fatty acids (citrems), lecithin products and any combination thereof.

In one aspect, the emulsifier(s) used is one or more emulsifiers selected from the group consisting of monoglycerides or lactic acid ester of monoglycerides.

In one aspect, at least one of the emulsifiers is an anionic emulsifier, such as an anionic emulsifier selected from the group consisting of lactylates, diacetyltartaric acid esters of mono- and diglycerides of fatty acids (datems), citric acid esters of mono- and diglycerides of fatty acids (citrems) and lecithin products.

In one aspect, the emulsifier is selected from the group consisting of monoglycerides or lactic acid ester of mono/diglycerides, and at least one anionic emulsifier.

In a preferred aspect, one or more the emulsifiers are selected from polyglycerol esters of fatty acids (PGE), polysorbate, monoglycerides, lactylates, lactic acid esters of mono- and diglycerides of fatty acids (lactems), citric acid esters of mono- and diglycerides of fatty acids (citrems), lecithin products and any combination thereof.

In one aspect, one or more emulsifiers are selected from the group of mono- and/or diglycerides of saturated or unsaturated fatty acids.

In one aspect, one or more emulsifiers is distilled monoglyceride (DMG).

In one aspect, the "mono- and/or diglycerides of saturated or unsaturated fatty acids" (i.e. monoglycerides, diglycerides and/or mono/diglycerides of saturated or unsaturated fatty acids) are produced from glycerol and natural fatty acids, mainly of plant origin, but also fats of animal origin may be used. In a further aspect, the mono- and/or diglycerides of saturated or unsaturated fatty acids is a mixture of different mono- and/or diglycerides of saturated or unsaturated fatty acids, with a composition similar to partially digested natural fat. In one aspect, a mono-glyceride is an ester in which one hydroxyl group of glycerol is esterified with a fatty acid. In a further aspect, a di-glyceride is an ester in which two hydroxyl groups of glycerol are esterified with two (same or different) fatty acids. The term monoglycerides is commonly used for commercial products produced by the interesterification of fats or oils (triacylglycerols) with glycerol. This process is referred to as glycerolysis, and the products manufactured by this process without further purification by solvent fractionation or molecular distillation techniques are often referred to as mono/diglycerides. Concentrated monoglycerides are usually referred to as distilled monoglycerides. The content of monoacylglycerols in the equilibrium mixture obtained after glycerolysis may vary from 10-60% depending on the glycerol/fat ratio in the reaction mixture. Commercial mono/diglycerides usually contain 45-55% monoacylglycerides, 38-45% diacylglycerides and 8-12% triacylglycerides with traces of un-reacted glycerol and free fatty acids. An alternative production method is direct esterification of fatty acids with glycerol. By using purified fatty acids, this produces mono/diglycerides with a narrow fatty acid distribution. Commercial mono/diglycerides (E471) are typically based on fatty acids with a chain length of C12-C22. The fatty acids can be saturated or mono-unsaturated or poly-unsaturated. Typical commercial mono/diglycerides comprises small amount of salts of fatty acids, not more than 6% (w/w), calculated as a sodium oleate. In one aspect, the mono/diglycerides comprise less than 6% (w/w) salts of fatty acids, calculated as a sodium oleate.

In one aspect, the emulsifier is selected from mono- and/or di-glyceride(s) of saturated or unsaturated fatty acid(s) and mixtures thereof, such as fatty acids with a chain length of C12-C22, such as E471.

In one aspect of the invention, the mono- and/or diglycerides of saturated or unsaturated fatty acids are used in the range of 0.01-1% (w/w), more preferred in a range of 0.05-0.5% (w/w), more preferred in a range of 0.1-0.4% (w/w).

In one aspect, said whipping cream has a pH of between 3 and 7.5. In a further aspect, said whipping cream is buffered to a pH between pH 5 and pH 7. In a further aspect, said whipping cream is buffered to a pH between pH 6 and PH 7.

In one aspect, the present invention relates to a whipped cream which is an aerated whipping cream as disclosed herein. The present invention thus also disclose a method for aeration of a whipping cream to obtain a whipped cream which method comprises the following steps: providing a whipping cream as disclosed herein, and aerating said whipping cream to obtain said whipped cream. The whipping of the cream may be performed by any method for whipping cream known by a person skilled in the art e.g. by whipping with a whisk, aeration in an industrial aeration equipment such as in a Mondo mixer or Hansa mixer type or aerated from an aerosol can. In one aspect, the whipping is at an increased shear rate gradient Shear rate gradient is the gradient in shear rates during whipping and other mechanical shear, going from the surface of the moving part to the position at a certain distance from the moving part, where no shear is taking place. In Newtonian liquids the shear rate (velocity profile) is constant, whereas for shear thinning liquids a very high shear rate is obtained close to the surface and is quickly reduced to almost zero some distance from the surface. In one aspect, the aeration of the whipping cream is at a temperature below 25° C.

In one aspect, the whipped cream is fat-stabilised.

It is not only the recipe that defines the whipping properties and the storage stability of the whipping cream such as an imitation cream. Also processing conditions, like homogenization and filling temperature and subsequent storage temperature and storage temperature fluctuations influence storage stability and whipping properties. The parameters, influencing imitation cream storage stability and whipping properties are known to the skilled person and have been described in detail by e.g. Boode and Walstra (ref 1 and 2), and Campell and Jones (ref 3).

Most often the product is subjected to UHT treatment followed by aseptic filling giving it a shelf life of 4-6 months at a storage temperature of lower than 20-25° C. In one aspect, the whipping cream is UHT treated.

In one aspect, disclosed herein is a whipping agent additive comprising high acyl gellan.

The whipping agent additive may also include protein(s), buffer salt(s), salt(s), emulsifier(s) and stabiliser(s) (e.g. hydrocolloids). Examples of these constituents are described above.

In a further aspect, disclosed herein is a method for aeration of a cream to obtain a whipped cream which method comprises the following steps: adding a whipping agent additive as disclosed herein to a cream in the manufacture of a whipping cream. In one aspect, the aeration of the whipping cream is at a temperature below 25° C. In a further aspect, the cream may also comprise one or more of the following: include protein(s), buffer salt(s), salt(s), emulsifier(s) and stabiliser(s) (e.g. hydrocolloids) either added before addition of the whipping agent additive or added after addition of said agent.

It has surprisingly been found that the aeration is improved by the addition of said high acyl gellan. Thus, the whipping speed (whipping time needed) and the firmness of said whipped cream is improved by the addition of said high acyl gellan in comparison with a whipped cream without addition of high acyl gellan, and/or in comparison with addition of other hydrocolloids, e.g. low acyl gellan. It has also been found that the improved aeration is without a reduction in the storage stability of said whipping cream compared to the storage stability of the same said whipping cream without addition of high acyl gellan.

Without wishing to be bound by any theory it appears based on the examples herein that which acyl gellan changes the cream microstructure to a more heterogeneous and finely structured fat microstructure. It furthermore appears based on the examples that high acyl gellan does not strongly influence the degree of fat agglomeration or fat partial coalescence in the cream.

It also appears based on the examples that which acyl gellan increases the viscosity of the cream with a higher elastic modulus due to its yield stress properties, but will not thicken by itself to an extent, where the cream is not pourable. It also appears based on the examples that which acyl gellan gives a quicker whipping of the cream with an increase in whipped cream firmness without compromising overrun.

In one aspect, high acyl gellan or a whipping agent additive as described herein provides an improvement in firmness of an aerated whipping cream.

In one aspect, high acyl gellan or a whipping agent additive as described herein provides an improvement in aeration of a low fat whipping cream, both in relation to whipping speed and final aerated whipped cream firmness.

In one aspect, high acyl gellan or a whipping agent additive as described herein provides a reduction in protein aggregation in whipping cream or whipped cream at acid pH.

In the present context, "acid pH" means a pH in the range of 3 to 6 In one aspect, high acyl gellan or a whipping agent additive as described herein provides a faster whipping of a whipping cream.

Disclosed herein are also the following embodiments:

A whipping cream comprising high acyl gellan.

Embodiment 1. The whipping cream according to embodiment 1, wherein said whipping cream comprises between 0.005% (w/w) and 0.2% (w/w) high acyl gellan.

Embodiment 2. The whipping cream according to any one of embodiments 1-2, wherein said whipping cream comprises between 0.0125% (w/w) and 0.1% (w/w) high acyl gellan.

Embodiment 3. The whipping cream according to any one of embodiments 1-3, wherein said whipping cream comprises between 0.02% (w/w) and 0.05% (w/w) high acyl gellan.

Embodiment 4. The whipping cream according to any one of embodiments 1-4, which high acyl gellan has a gelling profile where more than 50% of the gelling enthalpy is at temperatures above 40° C., as determined by DSC, when cooling a solution of 1% (w/w) gellan sodium salt in deionised water with 0.7 c/min.

Embodiment 5. The whipping cream according to any one of embodiments 1-5, which high acyl gellan has a gelling profile where more than 90% of the gelling enthalpy is at temperatures above 40° C., as determined by DSC, when cooling a solution of 1% (w/w) gellan sodium salt in deionised water with 0.7 c/min.

Embodiment 6. The whipping cream according to any one of embodiments 1-6, wherein said whipping cream comprises between 10% (w/w) and 45% (w/w) fat.

Embodiment 7. The whipping cream according to any one of embodiments 1-7, wherein said whipping cream comprises between 15% (w/w) and 40% (w/w) fat.

Embodiment 8. The whipping cream according to any one of embodiments 1-8, wherein said whipping cream comprises between 20% (w/w) and 35% (w/w) fat.

Embodiment 9. The whipping cream according to any one of embodiments 7-9, wherein part or all of said fat is vegetable fat.

Embodiment 10. The whipping cream according to any one of embodiments 7-10, wherein at least 80% of the total amount of fat in the whipping cream is vegetable fat, preferably at least 90% of the total amount of fat in the whipping cream is vegetable fat, and more preferred all of the fat is vegetable fat.

Embodiment 11. The whipping cream according to any one of embodiments 7-11, wherein said whipping cream comprises vegetable fat derived from one or more of the group consisting of coconut oil, palm kernel oil, palm oil, peanut oil, soybean oil, rapeseed oil, sunflower seed oil, cotton seed oil, olive oil, preferably derived from one or more of the group consisting of coconut oil, palm kernel oil and palm oil, more preferred derived from one or more of the group consisting of coconut oil and palm kernel oil and more preferred derived from palm kernel oil.

Embodiment 12. The whipping cream according to any one of embodiments 1-12 further comprising one or more of the following: protein(s), emulsifier(s), stabiliser(s), buffer salt(s), salt(s), sweetener(s), and flavour(s).

Embodiment 13. The whipping cream according to any one of embodiments 1-13 comprising one or more emulsifiers selected from the group consisting of polyglycerol esters of fatty acids (PGE), polysorbate, monoglycerides, mono/diglycerides, lactylates, lactic acid esters of mono- and diglycerides (lactems), diacetyltartaric acid esters of mono- and diglycerides of fatty acids (datems), citric acid esters of mono- and diglycerides of fatty acids (citrems), lecithin products and any combination thereof.

Embodiment 14. The whipping cream according to embodiment 14, wherein the emulsifier is selected from the group consisting of monoglycerides or lactic acid esters of mono- and diglycerides of fatty acids.

Embodiment 15. The whipping cream according to embodiment 15, wherein the emulsifier is selected from the group consisting of monoglycerides or lactic acid esters of mono- and diglycerides of fatty acids and at least one anionic emulsifier.

Embodiment 16. The whipping cream according to embodiment 16, wherein the anionic emulsifier is selected from the group consisting of lactylates, diacetyltartaric acid esters of mono- and diglycerides of fatty acids (datems), citric acid esters of mono- and diglycerides of fatty acids (citrems) and lecithin products.

Embodiment 17. The whipping cream according to any one of embodiments 1-17, wherein said whipping cream has a pH of between pH 3 and pH 7.5.

Embodiment 18. The whipping cream according to any one of embodiments 1-18, wherein said whipping cream is buffered to a pH between pH 5 and pH 7.

Embodiment 19. The whipping cream according to any one of embodiments 1-19, wherein said whipping cream is buffered to a pH between pH 6 and PH 7.

Embodiment 20. A whipped cream which is an aerated whipping cream as defined in any one of embodiments 1-20, preferably aerated at a temperature below 25° C.

Embodiment 21. A method for aeration of a whipping cream to obtain an aerated whipped cream which method comprises the following steps: providing a whipping cream as defined in any one of embodiments 1-20, and aerating said whipping cream to obtain said whipped cream, preferably aerating at a temperature below 25° C.

Embodiment 22. A whipping agent additive comprising high acyl gellan.

Embodiment 23. The whipping agent additive according to embodiment 23 further comprising one or more of the following protein(s), buffer salt(s), salt(s), emulsifier(s) and stabiliser(s).

Embodiment 24. The whipping agent additive according to embodiment 24, wherein said protein is selected from the group consisting of sodium caseinate, skimmed milk powder, butter milk powder, pea protein and soy protein.

Embodiment 25. The whipping agent additive according to any one of embodiments 24-25, wherein said buffer salt is selected from the group consisting of citrates and phosphates.

Embodiment 26. The whipping agent additive according to any one of embodiments 24-26, wherein said stabiliser is selected from the group consisting of carrageenan, locust bean gum, tara gum, xanthan gum, pectin, alginate, guar gum, microcrystalline cellulose, methyl cellulose, carboxymethyl cellulose, hydroxypropylmethyl cellulose, starch products and gelatine.

Embodiment 27. A method for aeration of a cream to obtain a whipped cream which method comprises the following steps: adding a whipping agent additive according to any one of embodiments 23-27 to a cream in the manufacture of a whipping cream, preferably aerating at a temperature below 25° C.

Embodiment 28. Use of high acyl gellan or use of a whipping agent additive according to any one of embodiments 23-27 for providing an improvement in firmness to an aerated whipping cream.

Embodiment 29. Use of high acyl gellan or use of a whipping agent additive according to any one of embodiments 23-27 for improving storage stability of an aerated whipping cream.

Embodiment 30. Use of high acyl gellan or use of a whipping agent additive according to any one of embodiments 23-27 for improving aeration of a low fat whipping cream.

Embodiment 31. Use of high acyl gellan or use of a whipping agent additive according to any one of embodiments 23-27 for reducing protein aggregation in a whipping cream or in a whipped cream at acid pH.

Embodiment 32. Use of high acyl gellan or use of a whipping agent additive according to any one of embodiments 23-27 for providing faster whipping of a whipping cream.

Embodiment 33. The use according to any one of embodiments 29-33 wherein the whipping agent additive is used in order to obtain a whipping cream as defined in any one of embodiments 1-20 or a whipped cream as defined in any one of embodiments 21-22.

Embodiment 34. A whipped cream comprising high acyl gellan.

Embodiment 35. The whipped cream according to embodiment 35, which whipped cream has been aerated at a temperature below 25° C.

Embodiment 36. The whipped cream according to any one of embodiments 35-36, wherein said whipped cream comprises between 0.005% (w/w) and 0.2% (w/w) high acyl gellan.

Embodiment 37. The whipped cream according to any one of embodiments 35-37, wherein said whipped cream comprises between 10% (w/w) and 45% (w/w) fat.

Embodiment 38. The whipped cream according embodiment 38, wherein part or all of said fat is vegetable fat.

Embodiment 39. The whipped cream according to any one of embodiments 38-39, wherein at least 80% of the total amount of fat in the whipped cream is vegetable fat, preferably at least 90% of the total amount of fat in the whipped cream is vegetable fat, and more preferred all of the fat is vegetable fat.

Embodiment 40. The whipped cream according to any one of embodiments 38-40, wherein said whipped cream comprises vegetable fat derived from one or more of the group consisting of coconut oil, palm kernel oil, palm oil, peanut oil, soybean oil, rapeseed oil, sunflower seed oil, cotton seed oil, olive oil, preferably derived from one or more of the group consisting of coconut oil, palm kernel oil and palm oil, more preferred derived from one or more of the group consisting of coconut oil and palm kernel oil and more preferred derived from palm kernel oil.

Embodiment 41. The whipped cream according to any one of embodiments 35-41 further comprising one or more of the following: protein(s), emulsifier(s), stabiliser(s), buffer salt(s), salt(s), sweetener(s), and flavour(s).

Embodiment 42. The whipped cream according to any one of embodiments 35-42 comprising one or more emulsifiers selected from the group consisting of polyglycerol esters of fatty acids (PGE), polysorbate, monoglycerides, mono/diglycerides, lactylates, lactic acid esters of monoand diglycerides (lactems), diacetyltartaric acid esters of mono- and diglycerides of fatty acids (datems), citric acid esters of mono- and diglycerides of fatty acids (citrems), lecithin products and any combination thereof.

Embodiment 43. The whipped cream according to embodiment 43, wherein the emulsifier is selected from the group consisting of monoglycerides or lactic acid esters of mono- and diglycerides of fatty acids, and at least one anionic emulsifier.

Embodiment 44. The whipped cream according to embodiment 44, wherein the anionic emulsifier is selected from the group consisting of lactylates, diacetyltartaric acid esters of mono- and diglycerides of fatty acids (datems), citric acid esters of mono- and diglycerides of fatty acids (citrems) and lecithin products.

Embodiment 45. The whipped cream according to any one of embodiments 35-45, wherein the whipped cream has been aereated at temperature below 20° C., such as below 15° C., such as below 10° C., such as below 5° C.

Embodiment 46. The whipped cream according to any one of embodiments 35-46, wherein the whipped cream has been aereated at temperature above 1° C., such as above 2° C.

Embodiment 47. A method of producing a whipped cream which method comprises the following steps: adding high acyl gellan to obtain a whipping cream before or during aeration, which whipping cream is aerated at a temperature below 25° C.

Embodiment 48. The method according to embodiment 48, wherein the whipped cream has been aereated at temperature below 20° C., such as below 15° C., such as below 10° C., such as below 5° C.

Embodiment 49. The method according to any one of embodiments 48-49, wherein the whipped cream has been aereated at temperature above 1° C., such as above 2° C.

Embodiment 50. The method according to any one of embodiments 48-50, wherein said whipping cream comprises between 0.005% (w/w) and 0.2% (w/w) high acyl gellan.

Embodiment 51. The method according to any one of embodiments 48-50, wherein said whipping cream comprises between 0.0125% (w/w) and 0.1% (w/w) high acyl gellan.

Embodiment 52. The method according to any one of embodiments 48-52, wherein said whipping cream comprises between 0.02% (w/w) and 0.05% (w/w) high acyl gellan.

Embodiment 53. The method according to any one of embodiments 48-53, which high acyl gellan has a gelling profile where more than 50% of the gelling enthalpy is at temperatures above 40° C., as determined by DSC, when cooling a solution of 1% (w/w) gellan sodium salt in deionised water with 0.7 c/min.

Embodiment 54. The method according to any one of embodiments 48-54, which high acyl gellan has a gelling profile where more than 90% of the gelling enthalpy is at temperatures above 40° C., as determined by DSC, when cooling a solution of 1% (w/w) gellan sodium salt in deionised water with 0.7 c/min.

Embodiment 55. The method according to any one of embodiments 48-55, wherein said whipping cream comprises between 10% (w/w) and 45% (w/w) fat.

Embodiment 56. The method according to any one of embodiments 48-56, wherein said whipping cream comprises between 15% (w/w) and 40% (w/w) fat.

Embodiment 57. The method according to any one of embodiments 48-57, wherein said whipping cream comprises between 20% (w/w) and 35% (w/w) fat.

Embodiment 58. The method according to any one of embodiments 48-58, wherein part or all of said fat is vegetable fat.

Embodiment 59. The method according to any one of embodiments 48-59, wherein at least 80% of the total amount of fat in the whipping cream is vegetable fat, preferably at least 90% of the total amount of fat in the whipping cream is vegetable fat, and more preferred all of the fat is vegetable fat.

Embodiment 60. The method according to any one of embodiments 48-60, wherein said whipping cream comprises vegetable fat derived from one or more of the group consisting of coconut oil, palm kernel oil, palm oil, peanut oil, soybean oil, rapeseed oil, sunflower seed oil, cotton seed oil, olive oil, preferably derived from one or more of the group consisting of coconut oil, palm kernel oil and palm oil, more preferred derived from one or more of the group consisting of coconut oil and palm kernel oil and more preferred derived from palm kernel oil.

Embodiment 61. The method according to any one of embodiments 48-61, wherein said whipping cream further comprises one or more of the following: protein(s), emulsifier(s), stabiliser(s), buffer salt(s), salt(s), sweetener(s), and flavour(s).

Embodiment 62. The method according to any one of embodiments 48-62, wherein said whipping cream further comprises one or more emulsifiers selected from the group consisting of polyglycerol esters of fatty acids (PGE), polysorbate, monoglycerides, mono/diglycerides, lactylates, lactic acid esters of mono- and diglycerides (lactems), diacetyltartaric acid esters of mono- and diglycerides of fatty acids (datems), citric acid esters of mono- and diglycerides of fatty acids (citrems), lecithin products and any combination thereof.

Embodiment 63. The method according to embodiment 63, wherein the emulsifier is selected from the group consisting of monoglycerides or lactic acid esters of mono- and diglycerides of fatty acids.

Embodiment 64. The method according to embodiment 64, wherein the emulsifier is selected from the group consisting of monoglycerides or lactic acid esters of mono- and diglycerides of fatty acids and at least one anionic emulsifier.

Embodiment 65. The method according to embodiment 65, wherein the anionic emulsifier is selected from the group consisting of lactylates, diacetyltartaric acid esters of mono- and diglycerides of fatty acids (datems), citric acid esters of mono- and diglycerides of fatty acids (citrems) and lecithin products.

Embodiment 66. The method according to any one of embodiments 48-66, wherein said whipping cream has a pH of between pH 3 and pH 7.5.

Embodiment 67. The method according to any one of embodiments 48-67, wherein said whipping cream is buffered to a pH between pH 5 and pH 7.

Embodiment 68. The method according to any one of embodiments 48-68, wherein said whipping cream is buffered to a pH between pH 6 and PH 7.

Embodiment 69. A whipped product obtainable by the method according to any one of embodiments 48-69.

Embodiment 70. Use of high acyl gellan for providing an improvement in firmness to an aerated whipping cream and/or for improving storage stability of an aerated whipping cream and/or for improving aeration of a low fat whipping cream and/or for reducing protein aggregation in a whipping cream or in a whipped cream at acid pH and/or for providing faster whipping of a whipping cream, which aerated whipping cream or which whipped cream has been aerated at a temperature below 25° C.

Embodiment 71. Use of high acyl gellan for fat stabilisation of a whipped cream, which whipped cream is as described herein in the above.

Embodiment 72. A method of improving fat stabilisation of a whipped cream, which whipped cream is as described herein in the above.

EXAMPLES

Methods
Method for Preparing Whipping Cream
1. Heat water to 70° C. in mixer tank
2. Add Na-caseinate, sucrose and sorbitol to the water
3. Melt fat at 70° C.
4. Add GRINDSTED® WP 950 (or alternative compositions of emulsifiers, hydrocolloids and salts) to the melted oil
5. Add oil blend to the water phase
6. Premix on Silverson-3700 rpm for 1 minute
7. De-aerate for approximately 30 minutes in the bucket
UHT Treatment:
8. Preheat to 90° C.
9. Indirect heating 142° C. for 3 seconds
10. Downstream homogenisation at 150/30 bar, 75° C.
11. Cool to 8° C. (register the filling temp)
12. Filling and store cold (5° C.)

Example 1

3 vegetable whipping creams i.e. sample 5, 6 and 7 were produced according to the following process:
1. Heat water to 70° C. in mixer tank
2. Add Na-caseinate, sucrose and sorbitol to the water
3. Melt fat at 70° C.
4. Add GRINDSTED® WP 950 (or alternative compositions of emulsifiers, hydrocolloids and salts) to the melted oil
5. Add oil blend to the water phase
6. Premix on Silverson-3700 rpm for 1 minute
7. De-aerate for approximately 30 minutes in the bucket
UHT Treatment:
8. Preheat to 90° C.
9. Indirect heating 142° C. for 3 seconds
10. Downstream homogenisation at 150/30 bar, 75° C.
11. Cool to 8° C. (register the filling temp)
12. Filling and store cold (5° C.)
The recipes for sample 5, 6 and 7 are shown in table 1. Sample 5 contained 0.05% HA gellan from CPKelco (Kelcogel HMB-P), sample 6 contained 0.05% LA gellan from CPKelco (Kelcogel F) and sample 7 was a reference without gellan addition. The fat, Akotop P70 is from AarhusKarlshamn. The sorbitol, C*Pharm Sorbidex P, is from Cargill. The cream flavour, M—Cream 050001 T05358, is from Firmenich. GRINDSTED® PS 421 KOSHER Monodiglyceride/Polysorbate Blend; GRINDSTED® LACTEM P 22 KOSHER; PANODAN® 165 KOSHER DATEM; and GRINDSTED® WP 920 Stabiliser System is from DuPont. Other recipe components are available from many suppliers.

Before evaluation the samples were heat shocked 7 days at 27° C. to provoke any thickening effect in the bottle.

The rheology of the produced creams were measured by running a strain sweep on a Physica MCR 301 from Anton Paar. The following measurement program was used:

Geometry: Cup/bob system CC27-SN8626; d=0 mm
Temperature: 5° C.
Strain: 0.1-100% (frequency 1 Hz)

Figure 1:
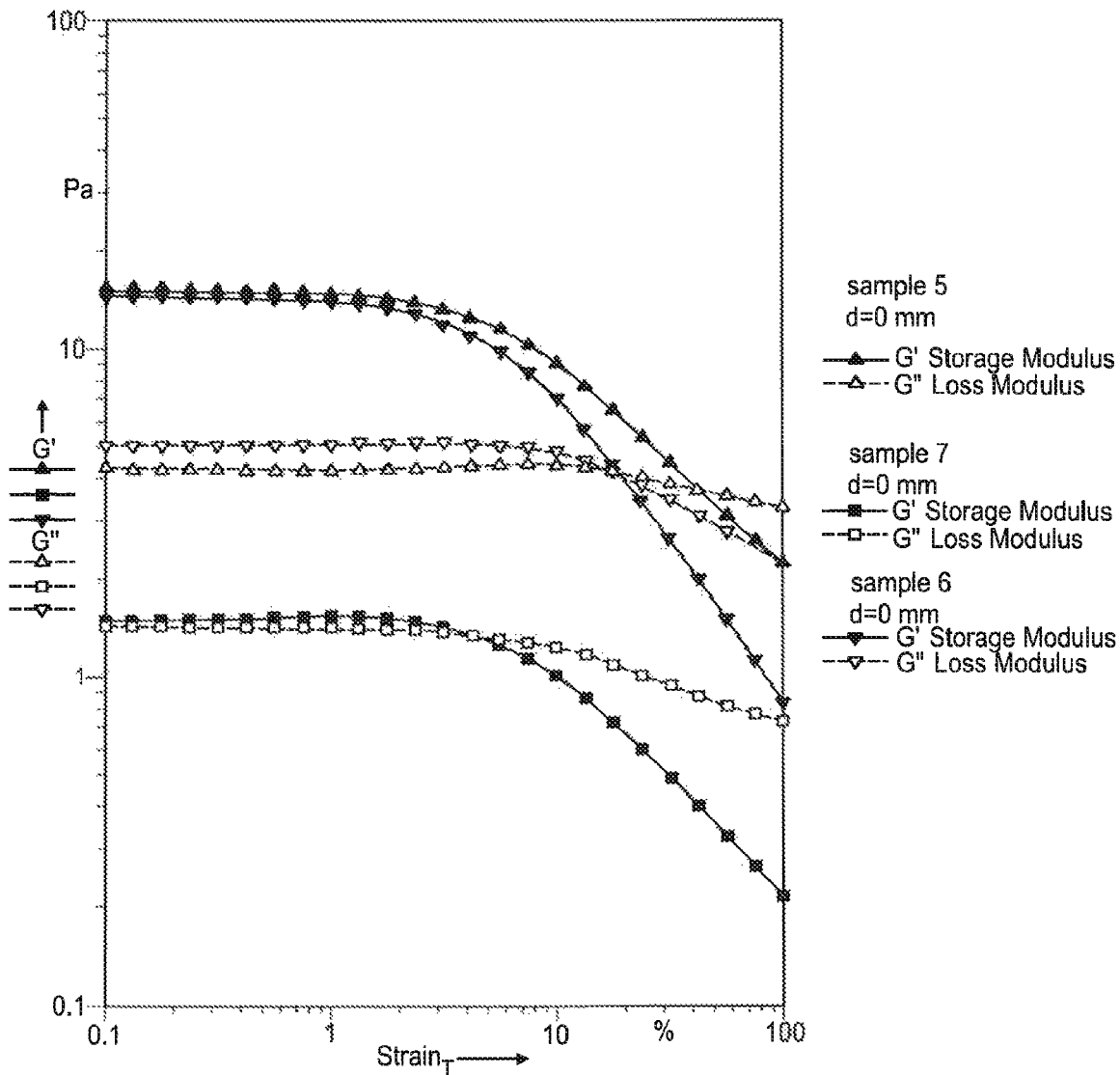
FIG. 1 shows a strain sweep of vegetable cream samples 5, 6 and 7 from Example 1.

Results are shown in FIG. 1. It is seen that the reference sample 7 without hydrocolloids has significantly lower storage and loss modulus than the samples 5 and 6, and furthermore storage and loss moduli are at the same magnitude. Sample 5 and 6 are almost identical with respect to storage and loss modulus, and both samples are characterized by having much higher storage modulus than loss modulus. All 3 samples were pourable and did not show any problematic thickening.

Figure 2:
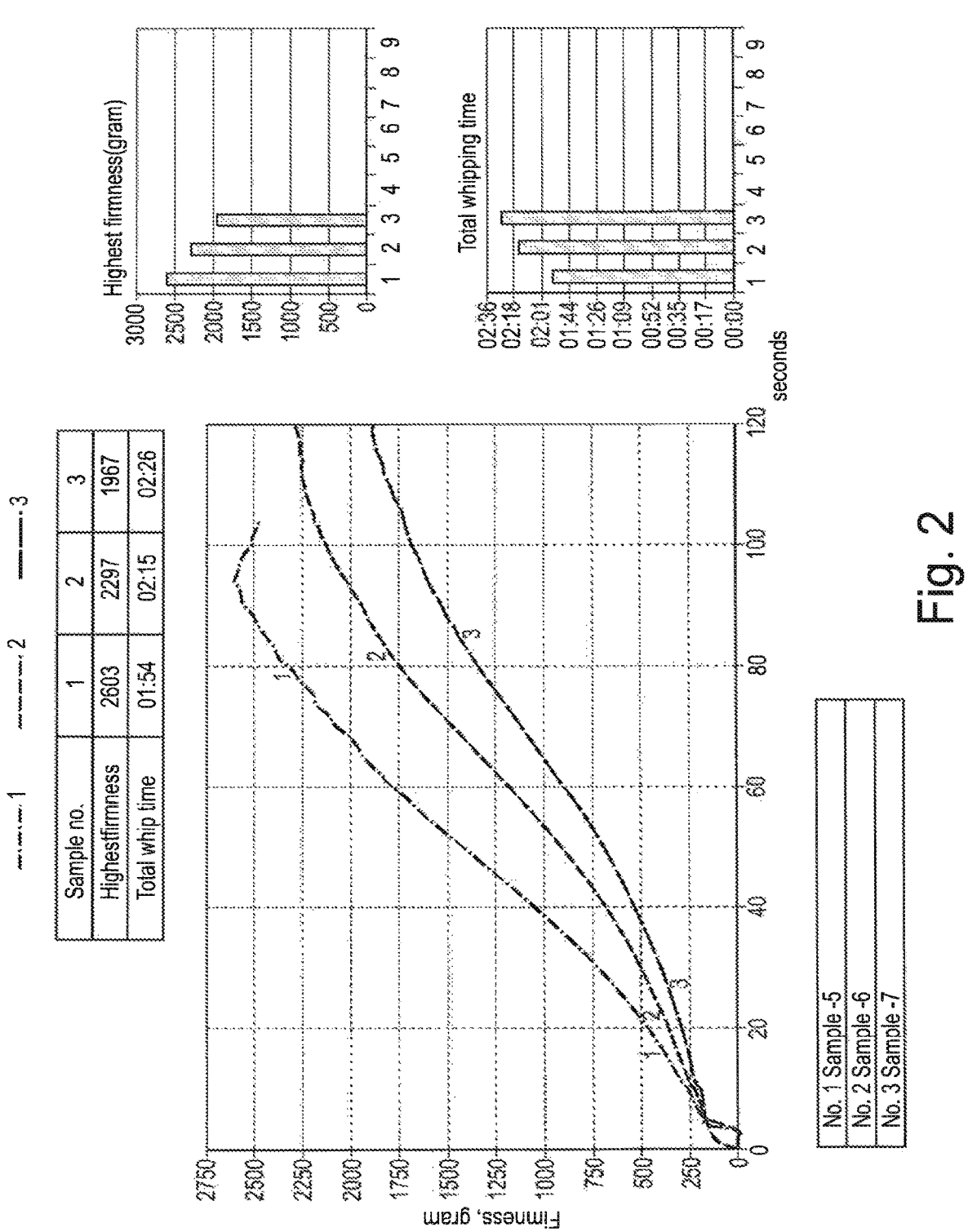
FIG. 2 shows the whipping profile of vegetable cream samples 5, 6 and 7 from Example 1.

Whipping of the vegetable cream samples 5, 6 and 7 was done on a Hobart mixer at speed 3. The cream, bowl and whisk were cooled to 5° C. before whipping. 400 gram cream was whipped, while measuring torque on the bowl. This allowed following the firming or "whipping profile" of the cream during whipping. The whipping was stopped, when the torque was not increased further during 10 seconds of whipping. In this way the cream was whipped to maximum firmness without over whipping, which will typically lead to foam collapse (lower overrun). Whipping profiles of samples 5, 6 and 7 are shown in FIG. 2, where also whipping time and max torque (highest firmness) is indicated. It is seen that sample 7 without hydrocolloids whips slower than the other samples and with less max torque. However it is also seen that sample 5 with HA gellan whips much faster than sample 6 with LA gellan despite approximately same cream rheology. The max torque for sample 5 is also higher than for sample 6.

Whipped cream samples were taken out, and overrun was determined. As whipped cream samples typically becomes firmer during the first period after whipping, firmness of the whipped creams was measured after 30 minutes (as a typical time for use after the whipping). The whipped cream firmness was measured at 5° C. on a Texture Analyzer TAXTplus from Stable Micro Systems. A 1 inch plunger was pressed 10 mm into the whipped cream at speed 1 mm/second, and maximum force was detected. In table 2 is shown overrun and Texture analyzer max force for samples 5, 6 and 7. It can be seen that the overrun of the samples are similar, but sample 5 with HA gellan shows much higher max force, that is firmness, of the whipped cream.

Thus HA gellan imparts special properties to the cream, namely faster whipping and firmer texture of the whipped cream without compromising overrun or stability of the cream in the bottle.

An investigation of the whipped vegetable cream microstructure, using confocal laser scanning microscopy (CLSM), also demonstrated that HA gellan (sample 5) creates a different whipped cream microstructure than LA gellan (sample 6) and the reference without hydrocolloids (sample 7). CLSM pictures are shown in FIG. 3. It is seen that sample 6 and 7 have rather similar and big air bubbles, while sample 5 has smaller air bubbles. Another difference, which is seen repeatable, is a difference in the fat microstructure (fat is seen as the less dark areas in the pictures). It is seen that sample 5 has a fat structure that is finer and not only distributed around air bubbles, but also to a higher degree has a finer fat structure across the water phase. Oppositely samples 6 and 7 show fat microstructures, which are more coarse fat structure that primarily is surrounding air bubbles and to a lesser extent and more coarsely is distributed in the water phase. Thus HA gellan results in a unique whipped cream fat microstructure.

TABLE 1

| | | Recipes for samples 5, 6 and 7 | |
| | | Ingredients in % | |
| Ingredient Name | Sample 5 | Sample 6 | Sample 7 |
|---|---|---|---|
| Akotop P70 | 27.2 | 27.2 | 27.2 |
| Sucrose | 13.0 | 13.0 | 13.0 |
| C*Pharm Sorbidex P | 1.00 | 1.00 | 1.00 |
| Dextrose | 2.00 | 2.00 | 2.00 |
| Sodium caseinate | 0.70 | 0.70 | 0.70 |
| Water (ion exchanged) | 54.5 | 54.5 | 54.6 |
| M - Cream 050001 T05358 | 0.20 | 0.20 | 0.20 |
| GRINDSTED ® PS 421 KOSHER Mono-diglyceride/Polysorbate Blend | 0.20 | 0.20 | 0.20 |
| GRINDSTED ® LACTEM P 22 KOSHER | 0.60 | 0.60 | 0.60 |
| PANODAN ® 165 KOSHER DATEM | 0.075 | 0.075 | 0.075 |
| GRINDSTED ® WP 920 Stabiliser System | 0.45 | 0.45 | 0.45 |
| Kelcogel HMB-P | 0.050 | | |
| Kelcogel F | | 0.050 | |
| Total % | 100 | 100 | 100 |

TABLE 2

| | | Texture analyzer |
| | Overrun and whipped cream firmness (max force) | |
| | for vegetable cream samples 5, 6 and 7. | |
| | Overrun (%) | max force (g) |
|---|---|---|
| Sample 5 | 291 | 147.2 |
| Sample 6 | 277 | 100.0 |
| Sample 7 | 294 | 100.5 |

Example 2

2 vegetable whipping cream samples were produced, sample 81 and 84, using the same process as in example 1. The recipes are shown in table 3. Sample 81 is a reference cream without gellan, and sample 84 contains 0.05% HA gellan (Kelcogel HMB-P). Samples were whipped after minimum 3 days storage at 5° C. and evaluated for their tolerance towards addition of acid fruit syrups, using the following procedure:

200 g Yoghurt-Erdbeer Sahne Fond (Vortella Lebensmittelwerk, Pr. Oldendorf, Germany) was mixed in 400 ml cold water and hydrated. 400 g cream at 5° C. was whipped at speed 3 in a Hobart mixer until max firmness (practical experience based on splashing sound from foam and foam appearance). Hydrated fond was added to the bowl and the foam was mixed in the Hobart for 20 seconds at speed 2. The resulting whipped cream was transferred to a plate, and the surface of the cream was scraped off to evaluate degree of graininess. Pictures of the foams were taken and shown in FIG. 4. It is clearly seen that sample 84 with HA gellan added is much more smooth than the reference 81 without gellan.

TABLE 3

| | Recipe for samples 81 and 84 | |
| | Ingredients in % | |
| Ingredient Name | Sample 81 | Sample 84 |
|---|---|---|
| Akotop P70 | 27.32 | 27.32 |
| Sucrose | 13.00 | 13.00 |
| Dextrose | 2.00 | 2.00 |
| C*pharm Sorbidex P | 1.00 | 1.00 |
| Sodium caseinate | 0.50 | 0.50 |
| GRINDSTED ® WP 920 Stabiliser System | 0.45 | 0.45 |
| GRINDSTED ® LACTEM P 22 KOSHER | 0.60 | 0.60 |
| PANODAN ® 165 KOSHER DATEM | 0.075 | 0.075 |
| Water (ion exchanged) | 55.05 | 55.00 |
| Kelcogel HMB-P | | 0.050 |
| Total % | 100 | 100 |

Example 3

Whipping cream samples were produced with decreasing amount of sodium caseinate to obtain increased fat agglomeration and fat coalescence in the vegetable cream, in this way both increasing the whipping properties (faster whipping time and increased foam firmness), but also increasing the risk of thickening of the cream in the bottle due to the fat agglomeration. A similar series of whipping cream samples with decreasing amount of sodium caseinate was added 0.035% HA gellan. The HA gellan product used was Gellan NM 205, consisting of 78% HA gellan and 22% dextrose. Gellan NM205 is produced by DuPont. The recipes are shown in table 4 (Samples 1-6). GRINDSTED® WP 950 Emulsifier & Stabiliser System is produced by DuPont. The flavours, S—Vanilla 507441 T and D—Cream 050001 U30377 are produced by Firmenich.

Vegetable cream processing is described in example 1. The samples were heat shock treated (Heat shock treatment: 5 days with a temperature cycle each day of approx 16 hours at 5 C and 8 hours at 20 C) before evaluation of the samples.

Visually the heat shocked samples 3 and 6 with the lowest protein content was thickened dramatically in the bottle and could not be poured. The other samples were not visually thickened and were easy to pour.

The produced vegetable whipping creams were analysed for fat globule size on a Malvern Master Sizer S Long Bed. The measurement was performed in water or with 1% SDS added. The size analysis, using water will inform about the globule size of the individual globules as well as agglomerated fat. Adding SDS will disintegrate agglomerated fat and ideally give information about fat globule size of the individual fat globules, enabling also to evaluate degree of fat coalescence. Results are shown in table 5. It is seen that fat globule size is close to 1 micron both in water and in 0.1% SDS at 0.7% and 0.5% Na-caseinate, irrespective of addition of HA gellan. At 0.3% Na-caseinate addition, irrespective of HA gellan addition, fat globule size is increased both in water and in 0.1% SDS, showing both increased fat agglomeration and increased fat coalescence, which also explains the thickening of these samples in the bottle.

Whipping profiles (as measured in example 1), is shown in FIG. 5 for the pourable samples 1, 2, 4 and 5. It is seen that both decreasing Na-caseinate content and HA gellan addition increase whipping speed and max torque. However HA gellan addition gives higher whipping speed (shorter whipping time) and higher max torque at 0.7% Na-caseinate addition than for vegetable whipping cream with 0.5% Na-caseinate without HA gellan. (sample 4 versus sample 2).

TABLE 4

Recipe for samples 1, 2, 3, 4, 5 and 6

| Ingredients in % Ingredient Name | 1 | 2 | 3 | 4 | 5 | 6 |
|---|---|---|---|---|---|---|
| Sodium caseinate | 0.70 | 0.50 | 0.30 | 0.70 | 0.50 | 0.30 |
| Akotop P70 | 25.6 | 25.6 | 25.6 | 25.6 | 25.6 | 25.6 |
| Water (Ion exchanged) | 59.5 | 59.7 | 59.9 | 59.5 | 59.7 | 59.9 |
| C*Pharm Sorbidex P | 1.0 | 1.0 | 1.0 | 1.0 | 1.0 | 1.0 |
| Sucrose | 11.0 | 11.0 | 11.0 | 11.0 | 11.0 | 11.0 |
| GRINDSTED ® WP 950 Emulsifier & Stabiliser System | 1.9 | 1.9 | 1.9 | 1.9 | 1.9 | 1.9 |
| S-Vanilla 507441 T | 0.06 | 0.06 | 0.06 | 0.06 | 0.06 | 0.06 |
| D-Cream 050001 U30377 | 0.20 | 0.20 | 0.20 | 0.20 | 0.20 | 0.20 |
| GELLAN NM 205 | | | | 0.035 | 0.035 | 0.035 |
| Total % | 100 | 100 | 100 | 100 | 100 | 100 |

Thus example 3 illustrates, that the negative effect on whipping properties by stabilizing the vegetable cream against thickening—in this case through high Na-caseinate dosage, but could also be trough addition of ionic emulsifiers—can be counteracted by addition of HA gellan, without compromising the cream stability.

TABLE 5

Fat globule size of samples 1-6

| | Sample no | | | | | |
|---|---|---|---|---|---|---|
| Mean globule size | 1 | 2 | 3 | 4 | 5 | 6 |
| D(4, 3) in water, μm | 1.2 | 1.3 | 4.3 | 1.2 | 1.8 | 9.7 |
| D(4, 3) in 0.1% SDS, μm | 0.94 | 1.2 | 1.8 | 1.4 | 1.2 | 3.6 |

Example 4

The effect of HA gellan dosage was investigated by running a dosage range and evaluate effect on whipping cream viscosity, rheology, fat globule size, whipping speed and max torque. Recipes are shown in table 6. The same processing conditions as in example 1 was used. Before analysis the samples were heat shock treated (Heat shock treatment: 5 days with a temperature cycle each day of approx 16 hours at 5 C and 8 hours at 20 C). Fat droplet size in water and 0.1% SDS is shown in table 7. Brookfield viscosity is shown in table 8 (10° C., spindle S62/63, 30 rpm, 30 sec). A strain sweep of samples 2, 5 and 7 is shown in FIG. 6. A whipping profile of the samples, including overrun measurements is shown in FIG. 7. Microstructures of the whipped creams (CLSM) are shown in FIG. 8. Fat globule size data confirm that fat globule size is not influenced by HA gellan addition. Brookfield data show gradual increase in viscosity, but not problematic and easily pourable, also at 0.035% HA gellan dosage. Strain sweep data show gradually increasing storage and viscous moduli upon increasing HA gellan dosage and with increased storage modulus domains (more elastic structure). All samples were easy to pour. Whipping profile data show gradual effects on whipping speed at increasing HA gellan dosage, but especially at 0.035% HA gellan dosage a significant effect on both whipping speed and maximum torque. Overrun was rather similar for all samples—however with a somewhat higher overrun at 0.035% HA gellan dosage. Microstructure data shows a gradual chance of microstructure as a function of HA gellan dosage—from large agglomerated fat structures, especially around air bubbles to smaller/fine stranded fat globule agglomerates, not only around air bubbles, but also within the liquid phase. This is especially seen at 0.035% HA gellan dosage. However the minimum dosage of HA gellan required to obtain the described effects depends on degree of standardization, e.g. with sugars. Also various HA gellan products may differ in efficiency, e.g. depending on molecular weight, content of glycerate and acetate etc. Also the specific vegetable whipping cream recipe will influence the HA gellan dosage needed.

TABLE 6

Recipes sample 1 and sample 2, 5 and 7
Ingredients in %

| Ingredient Name | 1 | 2 | 5 | 7 |
|---|---|---|---|---|
| Akotop P70 | 25.6 | 25.6 | 25.6 | 25.6 |
| Water (Ion exchanged) | 59.8 | 59.8 | 59.7 | 59.7 |
| Sodium caseinate | 0.70 | 0.70 | 0.70 | 0.70 |
| Sucrose | 11.0 | 11.0 | 11.0 | 11.0 |
| C*Pharm Sorbidex P | 1.0 | 1.0 | 1.0 | 1.0 |
| GRINDSTED ® WP 950 Emulsifier & Stabiliser System | 1.90 | 1.90 | 1.90 | 1.90 |
| Gellan gum NM 205 | | 0.010 | 0.025 | 0.035 |
| Total % | 100 | 100 | 100 | 100 |

TABLE 7

Fat droplet size of sample 1 and samples 2, 5 and 7

| | Sample no | | | |
|---|---|---|---|---|
| Mean globule size | 1 | 2 | 5 | 7 |
| D(4,3) in water, μm | 0.96 | 0.83 | 0.97 | 0.80 |
| D(4,3) in 0.1% SDS, μm | 0.69 | 0.57 | 0.66 | 0.68 |

TABLE 8

Brookfield viscosity of sample 1 and samples 2, 5 and 7

| Sample no | 1 | 2 | 5 | 7 |
|---|---|---|---|---|
| Brookfield viscosity, cP | 180 | 200 | 450 | 490 |

Example 5

The effect of HA on the whipping properties of the vegetable whipping cream at various fat levels was investigated. The positive effects of HA gellan on the whipping properties of the vegetable whipping cream are especially seen when the whipping properties are more moderate, e.g. when securing cream stability (no thickening in the bottle) by having high protein content and by adding ionic emulsifiers and when using low dosage of emulsifiers—as in example 1.

Moderate/reduced whipping properties may also be observed when, for example, lowering the fat content for cost or health reasons, or when diluting the cream with other components, eg syrups or fruit syrups.

In Example 5 it is illustrated how HA gellan can improve whipping properties of lower or low fat content whipping creams, and it is also illustrated in this example, how cream with extremely strong whipping properties is not necessarily benefitting from HA gellan addition.

The effect of HA gellan on the vegetable whipping cream whipping properties at various fat levels was investigated by producing vegetable whipping creams of fat level 28%, 23% and 18% with and without HA gellan addition. Recipes are shown in table 9. The same processing conditions as in example 1 was used. The HA gellan product used, "Gellan Gum DAI 90", is a 100% HA gellan product, produced by DuPont. It is observed that the sugar dosage (sucrose and dextrose) as well as GRINDSTED® WP 950 Emulsifier & Stabiliser System dosage are higher than in examples 3 and 4, aiming—for 28% fat recipe (sample 1)—at very efficient whipping properties, including an increased risk of over-whipping.

Whipping profiles are shown in FIG. 9. It is observed that whipping profile curves for samples 1 and 2 (with HA gellan) are very "steep" and is finalized by a reduction in torque, indicating some over-whipping. HA gellan increased slightly whipping speed and max torque on the Hobart. At the lower fat levels, 23% and 18%, the effect of HA gellan on whipping speed and max torque is increasingly more pronounced. Furthermore at these lower fat levels no over-whipping is observed (no final reduction in torque during whipping).

Texture analysis after 30 minutes of the whipped creams and overrun is shown in table 9. These data confirm observations from the Hobart whipping profiles. The full fat samples 1 and 2 have lowest overrun and high foam firmness, confirming some over-whipping. The difference in foam firmness (Texture Analyzer max force) between samples 1 and 2 may be explained by the difference in overrun. However when going to lower fat levels, table 10 shows increasingly greater effect of HA gellan addition on foam firmness (without influencing overrun significantly), reaching 20% increase in firmness for the 18% fat recipe.

Thus HA gellan is beneficial in creation of lower fat vegetable whipping creams with excellent whipping and whipped cream properties.

obvious to those skilled in the art are intended to be within the scope of the following claims.

All references discussed herein are incorporated herein by reference for all purposes.

REFERENCES

Ref 1: Boode K, Walstra P. *Colloids and Surfaces A: Physicochemical and Engineering aspects* 81 (1993), p. 121-137

Ref 2: Boode K, Walstra P. *Colloids and Surfaces A: Physicochemical and Engineering aspects* 81 (1993), p. 139-151

Ref 3: Campell I J, Jones M G. Cream Alternatives. Lipid Technologies and Applications, ed. by Gunstone and Padley; Marcel Dekker Inc; p. 355-368

Ref 4: Valli R, Clark R. Gellan Gum. Chapter 8 in Food Stabilisers, Thickeners and Gelling Agents, ed by Imeson; Blackwell Publishing Limited; p. 145-166

Ref 5: Morris E R. *Carbohydrate Polymers* 30 (1996), p. 165-175

The invention claimed is:

1. A whipping cream comprising high acyl gellan, wherein:
   the whipping cream comprises between 0.0125% (w/w) and 0.1% (w/w) high acyl gellan and between 15% (w/w) and 35% (w/w) fat;
   at least 80% of the fat in the whipping cream is vegetable fat;
   the vegetable fat has crystallinity at whipping temperature below 25° C. to facilitate aeration and stability of foam formed during whipping; and
   the whipping cream comprises one or more emulsifiers selected from the group consisting of monoglycerides, mono/diglycerides and lactic acid esters of mono- and diglycerides of fatty acids (lactems), and at least one anionic emulsifier.

2. The whipping cream according to claim 1, wherein said whipping cream comprises between 0.02% (w/w) and 0.05% (w/w) high acyl gellan.

TABLE 9 samples 1, 2, 4, 6 and 9.

| Ingredients in % Ingredient Name | 1 | 2 | 14 | 4 | 6 | 9 |
|---|---|---|---|---|---|---|
| Akotop P70/Polowar 70 | 26.7 | 26.7 | 21.7 | 21.7 | 16.7 | 16.7 |
| Sucrose | 13.0 | 13.0 | 13.0 | 13.0 | 13.0 | 13.0 |
| C*Pharm Sorbidex P | 1.00 | 1.00 | 1.0 | 1.00 | 1.00 | 1.00 |
| Dextrose | 2.00 | 2.00 | 2.0 | 2.00 | 2.00 | 2.00 |
| Sodium caseinate | 0.70 | 0.70 | 0.70 | 0.70 | 0.70 | 0.70 |
| GRINDSTED ® WP 950 Emulsifier & Stabiliser System | 2.00 | 2.00 | 2.0 | 2.00 | 2.00 | 2.00 |
| Water (Ion-exchanged) | 54.6 | 54.5 | 59.6 | 59.5 | 64.5 | 64.6 |
| S-Vanilla 507441 T | 0.050 | 0.050 | 0.050 | 0.050 | 0.050 | 0.050 |
| Gellan Gum DAI 90 | | 0.035 | | 0.035 | 0.035 | |
| Total % | 100 | 100 | 100 | 100 | 100 | 100 |

Various modifications and variations of the described embodiments will be apparent to those skilled in the art without departing from the scope and spirit of those embodiments. It should be understood that the subject matters as claimed should not be unduly limited to such specific embodiments. Indeed, various modifications of the described modes for carrying out the embodiments that are 3. The whipping cream according to claim 1, wherein said whipping cream comprises between 15% (w/w) and 30% (w/w) fat.

4. The whipping cream according claim 1, wherein all of said fat in the whipping cream is vegetable fat.

5. The whipping cream according to claim 1, wherein at least 90% of the total amount of fat in the whipping cream is vegetable fat.

6. The whipping cream according to claim 5, wherein said whipping cream comprises vegetable fat derived from one or more of the group consisting of coconut oil, palm kernel oil, palm oil, peanut oil, soybean oil, rapeseed oil, sunflower seed oil, cotton seed oil, and olive oil.

7. The whipping cream according to claim 1, further comprising one or more of the following: protein(s), emulsifier(s), stabilizer(s), buffer salt(s), salt(s), sweetener(s), and flavor(s).

8. The whipping cream according to claim 1, wherein the anionic emulsifier is selected from the group consisting of lactylates, diacetyltartaric acid esters of mono- and diglycerides of fatty acids (datems), and citric acid esters of mono- and diglycerides of fatty acids (citrems).

9. A method of producing a whipped cream, wherein the method comprises aerating the whipping cream of claim 1 at a temperature below 25° C.

10. The method according to claim 9, wherein at least 90% of the total fat in the whipping cream is vegetable fat.

11. The method according to claim 9, wherein the whipping cream is aerated at a temperature below 20° C.

12. The method according to claim 11, wherein the whipping cream is aerated at a temperature above 1° C.

13. The whipping cream according to claim 1, wherein said whipping cream comprises vegetable fat derived from one or more of the group consisting of coconut oil, palm kernel oil, and palm oil.

14. The whipping cream according to claim 1, wherein said whipping cream comprises vegetable fat derived from one or more of the group consisting of coconut oil and palm kernel oil.

15. The whipping cream according to claim 1, wherein said whipping cream comprises vegetable fat derived from palm kernel oil.

16. The method according to claim 11, wherein the whipping cream is aerated at a temperature below 15° C.

17. The method according to claim 11, wherein the whipping cream is aerated at a temperature below 10° C.

18. The method according to claim 11, wherein the whipping cream is aerated at a temperature below 5° C.

19. The method according to claim 10, wherein the whipping cream is aerated at a temperature above 2° C.

20. The whipping cream according to claim 1, wherein the high acyl gellan has a gelling profile where more than 50% of the gelling enthalpy is at temperatures above 40° C., as determined by differential scanning calorimetry when cooling a solution of 1% (w/w) gellan sodium salt in deionized water with 0.7 c/min.

21. The whipping cream according to claim 1, wherein: the whipping cream comprises 0.05% (w/w) high acyl gellan and 27% (w/w) fat.

22. The whipping cream according to claim 1, wherein: the whipping cream comprises 0.035% (w/w) high acyl gellan and 26% (w/w) fat.

* * * * *